United States Patent [19]

Schmalstieg et al.

[11] Patent Number: 5,151,484
[45] Date of Patent: Sep. 29, 1992

[54] ISOCYANATE PREPOLYMERS CONTAINING ETHER AND ESTER GROUPS A PROCESS FOR THEIR PREPARATION AND THEIR USE FOR THE PRODUCTION OF COATING, SEALING OR CASTING COMPOSITION

[75] Inventors: Lutz Schmalstieg, Cologne; Peter Höhlein, Kempen; Josef Pedain, Cologne; Wolfhart Wieczorrek, Kempen, all of Fed. Rep. of Germany

[73] Assignee: Bayer Aktiengesellschaft, Fed. Rep. of Germany

[21] Appl. No.: 823,226

[22] Filed: Jan. 21, 1992

[30] Foreign Application Priority Data

Jan. 26, 1991 [DE] Fed. Rep. of Germany ....... 4102341

[51] Int. Cl.$^5$ ............................................ C08G 18/80
[52] U.S. Cl. ...................................... 528/45; 528/49; 528/74.5; 528/76
[58] Field of Search .................... 528/45, 49, 74.5, 76

[56] References Cited

U.S. PATENT DOCUMENTS

| | | | |
|---|---|---|---|
| 3,248,349 | 4/1966 | Szabat et al. | 260/2.5 |
| 3,420,800 | 1/1969 | Haggis | 260/75 |
| 3,428,610 | 2/1969 | Kiebert | 260/75 |
| 3,625,994 | 7/1967 | Eck | 260/484 R |
| 3,743,626 | 7/1973 | Emmons | 260/77.5 AQ |
| 3,849,515 | 11/1974 | Muller | 260/860 |
| 4,605,729 | 8/1986 | Barnes et al. | 528/301 |
| 4,677,181 | 6/1987 | Höhlein et al. | 528/74.5 |

FOREIGN PATENT DOCUMENTS

1219987 3/1987 Canada .
1178955 10/1964 Fed. Rep. of Germany .

*Primary Examiner*—Maurice J. Welsh
*Attorney, Agent, or Firm*—Joseph C. Gil; Thomas W. Roy

[57] ABSTRACT

The present invention relates to isocyante prepolymers containing ether and ester groups, having an isocyanate content of 1.9% to 25% by weight and based on the reaction product of A) a polyisocyanate component containing at least one organic polyisocyanate having an average molecular weight of 168 to 1000, B) an organic polyhydroxyl component containing at least one polyhydroxyl compound containing ether and ester groups, having an average hydroxyl functionality of 2 to 3 and an average hydroxyl number of 40 to 90 and based on the esterification products of i) polyether polyols having an average hydroxyl number of 200 to 600 with ii) from 25 to 67 equivalent-%, based on the hydroxyl groups of component (i) and the carboxyl groups of component (ii), of an organic carboxylic acid component containing at least one organic monocarboxylic acid or a mixture of at least one organic monocarboxylic acid with up to 20 carboxyl equivalent-%, based on all the carboxylic acids, of polybasic organic carboxylic acids.

The present invention also relates to a process for the preparation of these isocyanate prepolymers containing ether and ester groups and to their as binders or binding components in low solvent or solvent-free polyurethane coating compositions, sealing compositions or casting compositions.

20 Claims, No Drawings

ISOCYANATE PREPOLYMERS CONTAINING ETHER AND ESTER GROUPS A PROCESS FOR THEIR PREPARATION AND THEIR USE FOR THE PRODUCTION OF COATING, SEALING OR CASTING COMPOSITION

BACKGROUND OF THE INVENTION

1. Field of the Invention

This invention relates to new isocyanate prepolymers containing ether and ester groups which are liquid at room temperature, to a process for their preparation and to their use as binders in solvent-free or low solvent polyurethane coating compositions, sealing compositions or casting compositions.

2. Description of the Prior Art

Coating compositions and casting compositions in which the binders are based on compounds which react to form polyurethanes are known (see e.g. Wagner Sarx, Lackkunstharze, 5th Edition, Carl Hanser Verlag, Munich, 1971, pages 153 to 173, and Kunststoff Handbuch, Volume 7, Hanser Verlag 1983, pages 540 to 561 and pages 425 to 428).

Solvent-free systems which enable coatings of any desired thickness to be produced in a single operating step are also described on pages 169 to 170 of the first mentioned publication and pages 556 to 559 of the second publication mentioned. The solvent-free coating compositions have become particularly important with the increasing interest in environmental hygiene. The preparation of solvent-free coatings requires the use of low viscosity starting materials.

Many binders containing isocyanate prepolymers and (potentially) isocyanate reactive compounds are known. Thus, for example, DE-OS 1,520,139 describes a process for the preparation of moisture hardening mixtures of polyisocyanates and polyketimines or polyaldimines in which the polyisocyanates used are preferably isocyanate prepolymers (NCO prepolymers). DE-AS 1,240,654 describes a process for the preparation of cross-linked synthetic resins from isocyanate prepolymers and special aromatic diamines. DE-OS 2,018,233 describes moisture hardening preparations of compounds containing isocyanate groups and polyoxazolidines.

The isocyanate prepolymers known in the art are prepared by the reaction of relatively high molecular weight polyhydroxyl compounds such as polyether or polyester polyols with excess quantities of di- or polyisocyanates.

Prepolymers based on polyester polyols give rise to synthetic resins with good resistance to light and aging by heat after they have been cross-linked but the prepolymers are highly viscous or even crystalline at room temperature due to their chemical constitution and therefore can only be worked up by the addition of solvents and/or plasticizers.

Prepolymers based on polyether polyols have a sufficiently low viscosity at room temperature to enable them to be worked up with little or no solvent. The synthetic resins obtained after cross-linking of these prepolymers have good hydrolysis resistance but insufficient resistance to light and oxygen. Another disadvantage is the increased formation of blisters which occurs during hardening of such prepolymers.

There are two solutions available according to the state of the art for combining the positive properties of polyester polyurethanes with those of polyether polyurethanes:

1. The preparation of prepolymers by reacting polyether/polyester mixtures with di- or polyisocyanates 2. The preparation of polyols containing ether and ester groups, e.g., as described in DE-OS 3,315,382, DE-PS 2,210,839, DE-OS 1,645,674, EP-A-0,178,562 and DE-OS 1,178,955, and the subsequent formation of prepolymers by reacting such polyols with di- or polyisocyanates.

The isocyanate prepolymers containing ether and ester groups prepared according to 1) or 2) are always more highly viscous than prepolymers based on polyether polyols. In many cases such prepolymers can only be used with the addition of organic solvents or plasticizers. It is well known, however, that the use of solvents is a disadvantage from an ecological point of view. Regulations demand the use of coating systems containing as little solvent as possible. The use of plasticizers also has disadvantages. Plasticizers remain in the coatings, are liable to impair the mechanical properties of the polymers and their adherence to the substrate and in the long term migrate out of the coatings.

An object of the present invention is to provide isocyanate prepolymers containing ether and ester groups which have low viscosities which are at least as low as isocyanate prepolymers based on known polyether polyols but which are free from their disadvantages.

This object has been achieved in accordance with the present invention with the isocyanate prepolymers described below.

The present invention is based on the surprising observation that prepolymers obtained from certain polyhydroxyl compounds containing ether and ester groups and commercially available polyisocyanates have markedly lower viscosities than prepolymers based on the same polyisocyanates and conventional polyethers and/or polyesters.

SUMMARY OF THE INVENTION

The present invention relates to isocyanate prepolymers containing ether and ester groups, having an isocyanate content of 1.9 to 25% by weight and based on the reaction product of A) a polyisocyanate component containing at least one organic polyisocyanate having an average molecular weight of 168 to 1000, B) an organic polyhydroxyl component containing
  1) polyhydroxyl compounds containing ether and ester groups, having an average hydroxyl functionality of 2 to 3 and an average hydroxyl number of 40 to 90 and based on the esterification products of
    i) polyether polyols having an average hydroxyl number of 200 to 600 with
    ii) from 25 to 67 equivalent-%, based on the hydroxyl groups of component (i) and the carboxyl groups of component (ii), of an organic carboxylic acid component containing at least one organic monocarboxylic acid or a mixture of at least one organic monocarboxylic acid with up to 20 carboxyl equivalent-%, based on all the carboxylic acids, of polybasic organic carboxylic acids and
  2) optionally organic polyhydroxyl compounds having a molecular weight of 62 to 200 in a quantity of up to 25 hydroxyl equivalent-%, based on component B1).

The present invention also relates to a process for the preparation of these isocyanate prepolymers containing ether and ester groups by reacting A) a polyisocyanate component containing at least one organic polyisocyanate having an average molecular weight of 168 to 1000 with B) an organic polyhydroxyl component containing
   1) polyhydroxyl compounds containing ether and ester groups, having an average hydroxyl functionality of 2 to 3 and an average hydroxyl number of 40 to 90 and based on the esterification products of
      i) polyether polyols having an average hydroxyl number of 200 to 600 with
      ii) from 25 to 67 equivalent-%, based on the hydroxyl groups of component (i) and the carboxyl groups of component (ii), of an organic carboxylic acid component containing at least one organic monocarboxylic acid or a mixture of at least one organic monocarboxylic acid with up to 20 carboxyl equivalent-%, based on all the carboxylic acids, of polybasic organic carboxylic acids and
   2) optionally organic polyhydroxyl compounds having a molecular weight of 62 to 200 in a quantity of up to 25 hydroxyl equivalent-%, based on component B1), at an NCO/OH equivalent ratio of 1.7:1 to 20:1 and optionally removing unreacted excess starting polyisocyanates A) by distillation.

Finally, the present invention relates to the use of the isocyanate prepolymers according to the invention as binders or binder components in low solvent or solvent-free polyurethane coating compositions, sealing compositions or casting compositions.

DETAILED DESCRIPTION OF THE INVENTION

Ether and ester group-containing polyhydroxyl compounds obtained as reaction products of polyether polyols with monobasic carboxylic acids are known and described in EP-A 0,209,823 and U.S. Pat. No. 3,248,349. The polyhydroxyl compounds described in these prior publications differ from component B1) of the present invention with regard to their hydroxyl number. Further, these polyhydroxyl compounds are not recommended for the preparation of isocyanate prepolymers, but rather as polyol components in two-component polyurethane systems (EP-A-0,209,823) or as reactants for organic polyisocyanates in the preparation of polyurethane foams (U.S. Pat. No. 3,248,349).

Any polyether polyols or polyether polyol mixtures having an average hydroxyl functionality of 4 to 6 and an (average) hydroxyl number of 200 to 600 mg KOH/g may be used as starting materials for the preparation of the polyhydroxyl compounds required for the present invention. These polyether polyols may be obtained in known manner by the alkoxylation of suitable starter molecules or suitable mixtures of starter molecules. Preferred alkoxylation compounds are propylene oxide and ethylene oxide which may optionally be used in admixture and/or successively in any desired sequence. Other alkylene oxides may also be used as part or all of the alkoxylation compounds for the preparation of the polyether polyols, e.g., 1,2-butylene oxide, 2,3-butylene oxide or styrene oxide. Examples of suitable starter molecules include alcohols having a functionality of four or more (such as pentaerythritol, sorbitol, mannitol, saccharose, lactose, sorbitan, α methylglycosite, α hydroxyalkylglycosite and mixtures thereof) with difunctional or trifunctional starter molecules (such as water, ethylene glycol, propylene glycol, glycerol and trimethylolpropane). When mixtures of starter molecules are used, the above-mentioned condition concerning the hydroxyl functionality should be observed.

It is not necessary, however, to adjust the functionality of component (i) by the selection of starter molecules to be used for alkoxylation; instead, separately prepared polyether polyols differing in their functionality and hydroxyl number may be mixed together in such proportions that the mixture conforms to the above-mentioned conditions concerning functionality and hydroxyl number. Mono- or polyamines such as ethylamine, ethanolamine, ethylene diamine or hexamethylene diamine may also be used or included as starter molecules for the preparation of the polyether polyols or of the individual components of the polyether polyol mixture, although this is less preferred.

Any naturally occurring or synthetic monocarboxylic acids or mixtures of monocarboxylic acids may be used as component (ii) for the preparation of the polyhydroxyl compositions according to the invention. The monocarboxylic acids contain 2 to 30, preferably at least 10 and more preferably 10 to 24 carbon atoms. Aliphatic monocarboxylic acids are preferably used, more preferably unsaturated fatty acids having an iodine number of 10 to 300. Examples of suitable monocarboxylic acids include acetic acid, butyric acid, n-heptane carboxylic acid, n-nonane carboxylic acid, n-tridecane carboxylic acid, palmitic acid, stearic acid, benzoic acid, synthetic fatty acid mixtures having 10 to 18 carbon atoms and, in particular, unsaturated fatty acids such as soya fatty acid, peanut oil fatty acid, safflower oil fatty acid, conjuvandol fatty acid, oleic acid, tall oil fatty acid and mixtures of such carboxylic acids. Small quantities (up to 20 equivalent-%, based on the carboxyl groups) of polybasic carboxylic acids such as adipic acid, phthalic acid or terephthalic acid may be used, but is not preferred since the addition of such polybasic acids generally results in an undesirable increase in viscosity. The monocarboxylic acids used preferably carry no substituents such as hydroxyl groups.

The monocarboxylic acids are used for the preparation of the polyhydroxyl compounds according to the invention in a quantity of 25 to 67 equivalent-%, based on the hydroxyl groups of component (i) and the carboxyl groups of component (ii).

The esterification reaction is carried out in known manner as described in detail in EP-A 0,209,823 and the literature cited therein.

The resulting polyhydroxyl compositions to be used according to the invention have an (average) hydroxyl functionality of from 2 to 3, preferably from 2 to 2.5, an average hydroxyl number of from 40 to 90 and an acid number below 5. Their viscosity is generally from 250 to 1500 mPa.s/22° C.

The compounds which are suitable for use as polyisocyanate component A) include organic polyisocyanates having an average molecular weight of 168 to 1000. Examples of suitable polyisocyanates include hexamethylene diisocyanate, 1,3- and/or 1,4-diisocyanatocyclohexane, 1-isocyanato-3,3,5-trimethyl-5-isocyanatomethyl-cyclohexane (isophorone diisocyanate), 4,4'-diisocyanato-dicyclohexylmethane, 2,4-diisocyanatotoluene (and mixtures thereof with up to 35% by weight, based on the mixture, of 2,6-diisocyanatotoluene), 2,4'-diisocyanatodiphenylmethane, 2,2'-diisocyanatodiphenylmethane and 4,4'-diisocyanatodiphenylmethane.

It is preferred, however, to use non-volatile or relatively non-volatile polyisocyanates such as those which may be obtained by the cyclotrimerization or biuretization of the above-mentioned diisocyanates. Low molecular weight isocyanate prepolymers based on the above-mentioned diisocyanates may also be used according to the invention.

Included among the preferred polyisocyanates A) are aromatic polyisocyanates having an average molecular weight of from 174 to 500, in particular polyisocyanate mixtures of the diphenylmethane series which are liquid at room temperature. These liquid mixtures contain 4,4'-diisocyanatodiphenylmethane with 2,4- and optionally 2,2-diisocyanatodiphenylmethane or mixtures of these isomers with their higher homologues which may be obtained in known manner by the phosgenation of aniline/formaldehyde condensates. In accordance with the present invention "polyisocyanate mixtures of the diphenylmethane series" also include reaction products of 4,4'-diisocyanatodiphenylmethane or mixtures of 4,4'-diisocyanatodiphenylmethane and 2,4'-diisocyanatodiphenylmethane and optionally 2,2'-diisocyanatodiphenylmethane or the higher homologues previously described with subequivalent quantities of polyhydric alcohols, in particular propylene glycols having an average molecular weight of up to 700, or also the carbodiimide-modified derivatives of these polyisocyanates or polyisocyanate mixtures. The preferred polyisocyanates A) are compounds which are liquid at room temperature and have an isocyanate content of about 20 to 33% by weight.

To carry out the process according to the invention for the preparation of the isocyanate prepolymers, the polyisocyanates A) are reacted with the polyhydroxyl compounds B) at a temperature of 40° to 140° C., preferably from 50° to 110° C. The quantities of the reactants generally correspond to an NCO/OH equivalent ratio of 1.7:1 to 20:1.

When readily volatile polyisocyanates are used, the quantities of components A) and B) are generally chosen to correspond to an NCO/OH equivalent ratio of 1.7:1 to 2:1. When a larger excess of readily volatile polyisocyanates is used, this excess should be removed by thin layer distillation after prepolymer formation. When the prepolymers are prepared from less volatile polyisocyanates, in particular polyisocyanates of the diphenylmethane series, the excess polyisocyanate may be left in the prepolymer. In such cases, it has surprisingly been found that the viscosity of the prepolymers is to a large extent independent of the NCO/OH equivalent ratio chosen. The known catalysts used in polyurethane chemistry, such as 1,4-diazabicyclo[2,2,2]octane, bis-(dimethylaminomethyl)-phenol, benzyldimethylamine, bis-(dodecanoyloxy)-dibutyl tin and bis-(ethylhexanoyloxy)-tin, may optionally be used for the preparation of the prepolymers according to the invention.

Organic polyhydroxyl compounds having a molecular weight of 62 to 200 may be included in quantities of up to 25 hydroxyl equivalent-%, based on the hydroxyl groups of component B1). However, their use is not preferred in view of the resulting rapid increase in viscosity of the prepolymers. Examples of these chain lengthening agents or cross-linking agents include ethylene glycol, 1,3-butanediol, 1,4-butanediol, 1,6-hexanediol, glycerol and trimethylolpropane. Other polyhydroxyl compounds having a molecular weight above 200 which are not essential for this invention may also be included in minor quantities but this also is not preferred.

In solvent-free form, the isocyanate prepolymers according to the invention have an NCO content of 1.9 to 25% by weight, preferably 4 to 20% by weight, and a viscosity at 23° C. of 100 to 20,000 mPa.s, preferably 200 to 10,000 mPa.s.

Due to their low viscosity, the isocyanate prepolymers according to the invention are eminently suitable for the production of solvent-free or low solvent, moisture hardening one-component polyurethane coating, casting or sealing compositions. The prepolymers according to the invention are also suitable in particular as the isocyanate component in two-component polyurethane systems.

When the isocyanate prepolymers according to the invention are used as the polyisocyanate component in two-component polyurethane systems, the second component contains at least one compound having at least two isocyanate reactive groups or at least two groups capable of being converted hydrolytically into such groups, i.e., reversibly blocked isocyanate reactive groups. It is also possible but less preferred to use compounds containing both free isocyanate reactive groups and such reversibly blocked isocyanate reactive groups. Further, the use of several different compounds or mixtures containing both compounds having free isocyanate reactive groups and compounds having reversibly blocked isocyanate reactive groups is possible, but this is less preferred. The compounds used as the second component preferably have 2 to 4 free or reversibly blocked isocyanate reactive groups per molecule.

The quantity of the second component is selected to provide a two-component binder mixture having an equivalent ratio of isocyanate groups in the isocyanate prepolymer to free and/or reversibly blocked isocyanate reactive groups in the second component of 0.8:1 to 2:1, preferably 1:1 to 1.2:1.

Examples of reactants which may be used as the second component for reaction with the isocyanate prepolymers according to the invention include:

Polyoxazolidines of the type known from polyurethane chemistry, e.g., those described in DE-PS 2,018,233 (U.S. Pat. No. 3,743,626, herein incorporated by reference) and DE-OS 2,446,438 (U.S. Pat. No. 4,002,601, herein incorporated by reference);

Polyketimines or polyaldimines of the type known from polyurethane chemistry as described, for example, in DE-OS 1,520,139 (U.S. Pat. No. 3,420,800, herein incorporated by reference), U.S. Pat. No. 3,567,692 (herein incorporated by reference) and DE-OS 3,308,418 (U.S. Pat. No. 4,481,345, herein incorporated by reference);

aromatic polyamines, in particular diamines having sterically hindered amino groups such as those used as chain lengthening agents in U.S. Pat. No. 4,218,543 (herein incorporated by reference), preferably 1-methyl-3,5-diethyl-2,4-diaminobenzene and mixtures thereof with 1-methyl-3,5-diethyl-2,6-diaminobenzene; or polyhydric alcohols having a molecular weight of 62 to 399 or having a molecular weight of at least 400. Examples of suitable low molecular weight alcohols include ethylene glycol, propylene glycol, butanediol-(1,4), glycerol, trimethylolpropane, pentaerythritol, diethylene glycol, dipropylene glycol and mixtures of such polyols. Examples of suitable relatively high molecular weight alcohols include the above-mentioned starting materials B1) and also epoxide resins, phenol resins, alkyd resins, castor oil, polyester resins containing hydroxyl groups and silicone resins containing hydroxyl groups.

The two-component binders according to the invention are prepared by mixing the individual components together. When compositions having reversibly blocked isocyanate reactive groups are used, in particular reversibly blocked amino groups, the compositions obtained are stable in storage in the absence of moisture and rapidly harden in the presence of moisture after application to a suitable substrate. If necessary, the hardening reaction may be accelerated by the addition of known catalysts such as p-toluene sulphonic acid, dibutyl tin octoate or zinc chloride.

When reactive components containing free isocyanate reactive groups are used, i.e., in particular free amino or hydroxyl groups, the reaction mixtures obtained will react at room temperature to form polyurethanes or polyureas. These mixtures have only a limited pot life and must be processed within this pot life. The term "two-component binder" should be understood in this context to mean that the binders according to the invention are based on the above mentioned individual components, which may be combined to form a "one-shot" system if blocked isocyanate reactive components are used in combination with the isocyanate prepolymers according to the invention.

Inert organic solvents or plasticizers may be added to the individual components or to the compositions according to the invention before, during or after the binders have been prepared by mixing the individual components.

When polyoxazolidines, polyketimines or polyaldimines in particular are used as reactive components for the isocyanate prepolymers according to the invention, the solvents or plasticizers should be substantially anhydrous to ensure sufficient storage stability of the binders. The use of solvents or plasticizers is, however, less preferred in view of the object of providing binders having as low a solvent content as possible.

The addition of pigments and other auxiliary agents and additives required for most applications, such as fillers, levelling agents, etc., is preferably carried out by adding these additives to one of the starting components before the preparation of the binders according to the invention.

The one-component and two-component binders according to the invention are suitable in particular for the preparation of coating and sealing compositions. Coating compositions containing the binders according to the invention may be applied in one or more layers to any substrates by known methods, for example, by spraying, brush coating, immersion, flooding or the use of rollers or coating knives. Examples of suitable substrates include metal, wood, glass, stone, ceramic materials, concrete, rigid and flexible plastics, textiles, leather and paper.

The substrates may be coated with known primers before application of the coating compositions containing the binders according to the invention.

The following examples serve to further illustrate the invention. All parts and percentages are based on weight unless otherwise indicated.

EXAMPLES

Polyhydroxyl compound B1

6230 g of soya oil fatty acid and 4633 g of a 90% aqueous solution of a polyether having an OH number of 450 (average molecular weight 750, obtained by the propoxylation of sorbitol) were weighed under a stream of nitrogen into a 15 l stirrer vessel equipped with stirrer, heating means, nitrogen inlet tube, column and water discharge. The reaction mixture was then heated to 200° C. for about 3 hours.

The temperature measured at the head of the column during this time did not exceed 105° C. As soon as the sump temperature reached 200° C. and the head temperature fell below 90° C., the column was first removed and the stream of nitrogen was then increased to 30 liters per hour.

Condensation was continued until an acid number of 1.4 mg KOH/g was obtained. The reaction mixture was then cooled to 100° C. and the product was filtered through a fabric filter. The product obtained has the properties:
Viscosity: 310 mPa.s/23° C.
Acid number: 1.4 mg KOH/g.
OH number: 66.
Iodine color number: 2.
Average hydroxyl functionality: 2.

Polyhydroxyl compound B2

The procedure was the same as that described for polyhydroxyl compound B1. 5960 g of a synthetic fatty acid (Prichem 9600, molecular weight 225, manufacturer Unichema) and 4965 g of a 90% aqueous solution of a polyether having an OH number of 450 (average molecular weight 750, obtained by the propoxylation of sorbitol) were used as starting materials. A polyol having the following properties was obtained after the reaction:
Viscosity: 450 mPa.s/23° C.
Acid number: 1.3 mg KOH/g.
OH number: 70.
Iodine color number: 3.
Average hydroxyl functionality: 2.

Polyhydroxyl compound B3

The procedure was the same as that described for polyhydroxyl compound B1. 2630 g of peanut oil fatty acid and 4633 g of the aqueous polyether solution used for polyhydroxyl compound B1 were used as starting materials. A polyol having the following properties was obtained after the reaction:
Viscosity: 360 mPa.s/23° C.
Acid number: 1.4 mg KOH/g.
OH number: 67.
Iodine color number: 4.
Average hydroxyl functionality: 2.

EXAMPLE 1

Prepolymer 1

86.15 g of 2,4-diisocyanatotoluene and 413.85 g of polyhydroxyl compound B3 were heated to 50° C. and reacted to form a prepolymer at this temperature for 7 hours. An isocyanate prepolymer having the following properties was obtained:
NCO content: 4.1%.
Viscosity: 4700 mPa.s/23° C.

Monomer content: 0.85% of free 2,4-diisocyanatotoluene.

EXAMPLE 2

Prepolymer 2

111 g of isophorone diisocyanate and 400 g of polyhydroxyl compound B2 were reacted to from a prepolymer at 60° C. for 6 hours with the addition of 0.2 g of dibutyl tin dilaurate. A prepolymer having the following properties was obtained:

NCO content: 4.05% .
Viscosity: 5800 mPa.s/23° C.
Monomer content: 2.8% of free isophorome diisocyanate.

EXAMPLE 3

Prepolymer 3

1110 g of isophorone diisocyanate and 800 g of polyhydroxyl compound B2 were reacted to from a prepolymer at 100° C. until the theoretical isocyanate content of 26.4% was reached. The mixture was then subjected to a thin layer distillation at 140° C./0.1 mbar. A prepolymer having the following properties was obtained after distillation:

NCO content: 4.35%.
Viscosity: 4100 mPa.s/23° C.
Monomer content: <0.5% of free isophorone diisocyanate.

EXAMPLE 4

Prepolymer 4

703 g of an isocyanurate group-containing polyisocyanate obtained by the trimerization of 1,6-diisocyanatohexane and having an isocyanate content of 21.5% and a viscosity of 3000 mPa.s/23° C. (Desmodur N 3300, available from Bayer AG) were reacted to form a prepolymer with 297 g of polyhydroxyl compound B1 at 85° C. for 2 hours. A prepolymer having the following properties was obtained:

NCO content: 13.1%.
Viscosity: 15,000 mPa.s/23° C.

EXAMPLE 5

Prepolymer 5

655 g of a polyisocyanate mixture of the diphenylmethane series having an isocyanate content of 31% and a viscosity of 40 mPa.s/23° C. (Desmodur VL 50, available from Bayer AG) were reacted to form a prepolymer with 343 g of polyhydroxyl compound B1 at 50° C. for 3 hours. A prepolymer having the following properties was obtained:

NCO content: 19.25%.
Viscosity: 240 mPa.s/23° C.

EXAMPLE 6

Prepolymer 6

615 g of the polyisocyanate from Example 5 were reacted with 385 g of polyhydroxyl compound B1 as in Example 5. A prepolymer having the following properties was obtained:

NCO content: 17.5%.
Viscosity: 310 mPa.s/23° C.

EXAMPLE 7

Prepolymer 7

360 g of the polyisocyanate from Example 5 were reacted as in Example 5 with 440 g of polyhydroxyl compound B1. A prepolymer having the following properties was obtained:

NCO content: 15.6%.
Viscosity: 360 mPa.s/23° C.

Examples 5 to 7 show that the viscosity of the prepolymer was to a large extent independent of the chosen NCO/OH equivalent ratio.

EXAMPLE 8

Preparation of a solvent-free two-component polyurethane coating composition 103 g of Prepolymer 1 and 8.9 g of 1-methyl-3,5-diethyl-2,4-diamino-benzene were thoroughly stirred together. The mixture had an initial viscosity of 4400 mPa.s/23° C. and a pot life of 15 minutes. A film coated on a glass plate at room temperature was completely dry after about 45 minutes. A high gloss, elastic film with high tear resistance was obtained after aging.

EXAMPLE 9

Preparation of a solvent-free two-component polyurethane coating 218 g of Prepolymer 5 and 340 g of a polyol mixture consisting of 75 parts by weight of castor oil and 25 parts by weight of a condensation product of cyclohexanone and formaldehyde (OH number 165, viscosity 5000 mPa.s/23° C.) were thoroughly mixed together. The mixture had an initial viscosity of 2400 mPa.s/23° C. and a pot life of 70 minutes. A film coated on a glass plate hardened to a tough elastic polymer with good abrasion resistance. No formation of blisters was observed in the course of hardening.

EXAMPLE 10

Preparation of a prepolymer based on a polyether for comparison with Example 1

850 g of a polyether obtained by the propoxylation of propylene glycol (OH number 66, viscosity 310 mPa.s/23° C.) and 174 g of 2,4-diisocyanatotoluene were heated to 50° C. and reacted to form a prepolymer at this temperature for 7 hours. An isocyanate prepolymer having the following properties was obtained:

NCO content: 4.1%.
Viscosity: 7200 mPa.s/23° C.
Monomer content: 0.79% of free 2,4-diisocyanatotoluene.

EXAMPLE 11

Preparation of a prepolymer based on a polyether for comparison with Example 5

360 g of the polyisocyanate from Example 5 were reacted to form a prepolymer with 440 g of the polyether from Example 10 at 50° C. for 4 hours. An isocyanate prepolymer having the following properties was obtained:

NCO content: 15.4%.
Viscosity: 980 mPa.s/23° C.

EXAMPLE 12

218 g of Prepolymer 5 and 848 g of polyhydroxyl compound B1 were intimately mixed. A mixture having an extremely low initial viscosity of only 200 mPa.s/23° C. was obtained. The pot life was 70 minutes. A film applied to a glass plate hardened to a high gloss, tough elastic polymer film which was free from blisters.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An isocyanate prepolymer containing ether and ester groups, having an isocyanate content of 1.9 to 25% by weight and comprising the reaction product of
A) a polyisocyanate component containing at least one organic polyisocyanate and having an average molecular weight of 168 to 1000,
B) an organic polyhydroxyl component containing
   1) at least one polyhydroxyl compound containing ether and ester groups, having an average hydroxyl functionality of 2 to 3 and an average hydroxyl number of 40 to 90 and comprising the esterification product of
      i) at least one polyether polyol having an average hydroxyl number of 200 to 600 with
      ii) from 25 to 67 equivalent-%, based on the hydroxyl groups of component (i) and the carboxyl groups of component (ii), of an organic carboxylic acid component containing at least one organic monocarboxylic acid or a mixture of at least one organic monocarboxylic acid with up to 20 carboxyl equivalent-%, based on all the carboxylic acids, of polybasic organic carboxylic acids and
   2) optionally an organic polyhydroxyl compound having a molecular weight of 62 to 200 in a quantity of up to 25 hydroxyl equivalent-%, based on component B1).

2. The isocyanate prepolymer of claim 1 wherein component A) comprises an aromatic polyisocyanate having a molecular weight of 174 to 500.

3. The isocyanate prepolymer of claim 1 wherein component A) comprises a polyisocyanate mixture of the diphenylmethane series.

4. The isocyanate prepolymer of claim 1 wherein component ii) comprises a fatty acid having more than 10 carbon atoms.

5. The isocyanate prepolymer of claim 2 wherein component ii) comprises a fatty acid having more than 10 carbon atoms.

6. The isocyanate prepolymer of claim 3 wherein component ii) comprises a fatty acid having more than 10 carbon atoms.

7. The isocyanate prepolymer of claim 1 wherein component ii) comprises an unsaturated fatty acid having more than 10 carbon atoms and an iodine number of 10 to 300.

8. The isocyanate prepolymer of claim 2 wherein component ii) comprises an unsaturated fatty acid having more than 10 carbon atoms and an iodine number of 10 to 300.

9. The isocyanate prepolymer of claim 3 wherein component ii) comprises an unsaturated fatty acid having more than 10 carbon atoms and an iodine number of 10 to 300.

10. A process for the preparation of an isocyanate prepolymer containing ether and ester groups and having an isocyanate content of 1.9 to 25% by weight which comprises reacting
A) a polyisocyanate component containing at least one organic polyisocyanate and having an average molecular weight of 168 to 1000 with
B) an organic polyhydroxyl component containing
   1) at least one polyhydroxyl compound containing ether and ester groups, having an average hydroxyl functionality of 2 to 3 and an average hydroxyl number of 40 to 90 and comprising the esterification product of
      i) at least one polyether polyol having an average hydroxyl number of 200 to 600 with
      ii) from 25 to 67 equivalent-%, based on the hydroxyl groups of component (i) and the carboxyl groups of component (ii), of an organic carboxylic acid component containing at least one organic monocarboxylic acid or a mixture of at least one organic monocarboxylic acid with up to 20 carboxyl equivalent-%, based on all the carboxylic acids, of polybasic organic carboxylic acids and
   2) optionally an organic polyhydroxyl compound having a molecular weight of 62 to 200 in a quantity of up to 25 hydroxyl equivalent-%, based on component B1).

at an NCO/OH equivalent ratio of 1.7:1 to 20:1 and optionally removing unreacted excess starting by distillation.

11. The process of claim 10 wherein component A) comprises an aromatic polyisocyanate having a molecular weight of 174 to 500.

12. The process of claim 10 wherein component A) comprises a polyisocyanate mixture of the diphenylmethane series.

13. The process of claim 10 wherein component ii) comprises a fatty acid having more than 10 carbon atoms.

14. The process of claim 11 wherein component ii) comprises a fatty acid having more than 10 carbon atoms.

15. The process of claim 12 wherein component ii) comprises a fatty acid having more than 10 carbon atoms.

16. The process of claim 10 wherein component ii) comprises an unsaturated fatty acid having more than 10 carbon atoms and an iodine number of 10 to 300.

17. The process of claim 11 wherein component ii) comprises an unsaturated fatty acid having more than 10 carbon atoms and an iodine number of 10 to 300.

18. The process of claim 12 wherein component ii) comprises an unsaturated fatty acid having more than 10 carbon atoms and an iodine number of 10 to 300.

19. A coating, sealing or casting composition wherein the binder comprises the isocyanate prepolymer of claim 1 and a compound containing at least two isocyanate reactive groups.

20. The coating, sealing or casting composition wherein the isocyanate reactive groups are reversibly blocked.

* * * * *